(No Model.)

A. J. CLARK.
HORSESHOE.

No. 573,503. Patented Dec. 22, 1896.

Witnesses
Henry F. Hills
K. W. Yau

Inventor,
Alfred J. Clark,
by John Wedderburn
Attorney

UNITED STATES PATENT OFFICE.

ALFRED J. CLARK, OF LENOX, MASSACHUSETTS.

HORSESHOE.

SPECIFICATION forming part of Letters Patent No. 573,503, dated December 22, 1896.

Application filed June 18, 1896. Serial No. 595,959. (No model.)

*To all whom it may concern:*

Be it known that I, ALFRED J. CLARK, a citizen of the United States, residing at Lenox, in the county of Berkshire and State of Massachusetts, have invented certain new and useful Improvements in Horseshoes; and I do hereby declare the following to be a full, clear, and exact description of the invention, such as will enable others skilled in the art to which it appertains to make and use the same.

This invention relates to horseshoe-calks.

My object is to provide a simple horseshoe-calk which can be easily applied and removed, and owing to its peculiar construction will be held firmly in position against displacement occasioned by strain during use.

The invention consists of certain novel features and combinations, as will appear more fully hereinafter.

Figure 1:
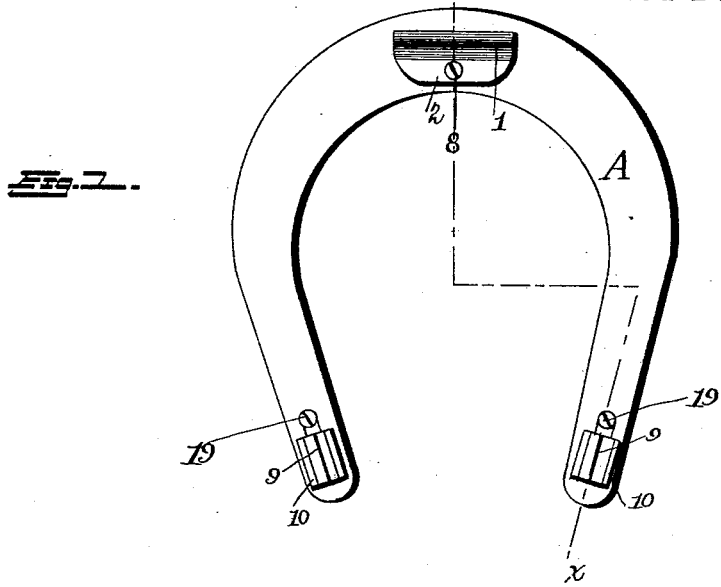
Figure 2:
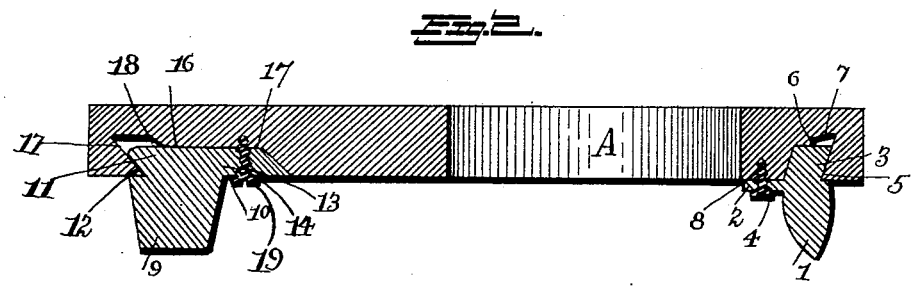
Figures 3, 4:
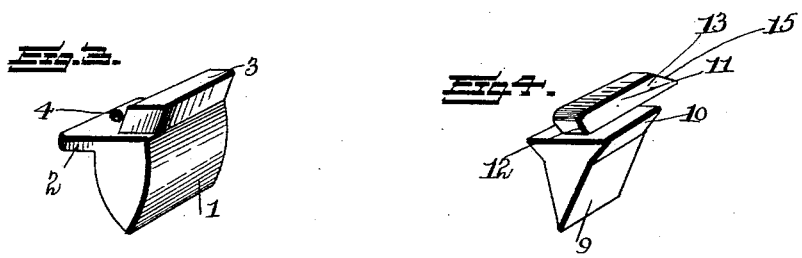

In the accompanying drawings, Figure 1 is a bottom plan view; Fig. 2, a longitudinal sectional view taken on the line $xx$ of Fig. 1, showing a horseshoe equipped with my improvements; Fig. 3, a detail view of toe-calk, and Fig. 4 a detail view of one of the heel-calks.

A designates an ordinary horseshoe.

I will describe the toe-calk and the heel-calks in their order.

The toe-calk is provided with a broad spur 1, a base-flange 2, and a peculiarly-shaped tenon 3. The spur and base-flange are of ordinary construction, the latter being provided with a screw-hole 4. The tenon is elongated and substantially rhombic in cross-section. The toe of the horseshoe is provided with a mortise 5, into which the tenon is adapted to fit snugly. The bottom of this mortise is formed with a narrow ledge 6 and an inclined portion 7. This construction is provided so that the tenon can be easily inserted by tipping the calk over toward the arch of the toe. A screw 8 secures the calk in position.

The heel-calks being similar, a description of one will suffice. The spur 9 is provided with a base 10, from the center of which projects a tenon 11, which is substantially square in cross-section. The tenon is cut away on an incline at 12 and is also slightly rounded at that point. It is also provided with a forward extension 13, provided with a screw-hole 14 and having an inclined end 15.

The heels of the horseshoe are provided with mortises 16 for the reception of the tenons of the heel-calks. Each of these mortises has a flat bottom, but is provided with a front inclined end 17 to accommodate the end 15 of the tenon, and is also cut away, as at 18, so that the tenon can be easily inserted in a manner similar to the operation with the toe-calk. A fastening-screw 19 holds the calk in position. This peculiar construction of the tenons renders it impossible for them to pull out unless the screw gives way, which is exceedingly rare, because very little strain is centered upon it.

Having thus described the invention, what is claimed as new is—

1. In a horseshoe, the combination with a shoe provided with a mortise which is extended deeper in one portion than another, thereby providing a ledge, of a calk having a tenon adapted for reception in the mortise, and means for holding the calk to the shoe.

2. In a horseshoe, the combination with a shoe provided with an oblique or slanting mortise, said mortise being extended at its bottom deeper in one portion than another, thereby providing a ledge, of a calk provided with an oblique tenon which fits in the mortise and rests on the ledge, and a fastening-screw for securing the tenon to the shoe.

3. In a horseshoe, the combination with a shoe having a mortise which is deepened in its bottom at one portion, of a calk provided with a tenon that extends out from or overhangs the calk, said tenon being adapted for reception in the mortise, and means for securing the calk to the shoe.

4. In a horseshoe, the combination with a shoe provided with a mortise having oblique ends and being deepened in one portion of its bottom, of a calk provided with a tenon also having oblique ends, said tenon extending out from or overhanging the calk, being adapted for reception in the mortise, and a fastening-screw passing through the overhanging portion of the tenon and of the shoe.

In testimony whereof I have signed this specification in the presence of two subscribing witnesses.

ALFRED J. CLARK.

Witnesses:
 THOMAS POST,
 HENRY SEDGWICK.